(12) United States Patent
Hong et al.

(10) Patent No.: US 9,796,088 B2
(45) Date of Patent: *Oct. 24, 2017

(54) ROBOT CLEANER AND CONTROL METHOD THEREOF

(71) Applicant: Samsung Electronics Co., Ltd., Suwon-si (KR)

(72) Inventors: Jun Pyo Hong, Suwon-si (KR); Dong Min Shin, Suwon-si (KR); Jun Hwa Lee, Suwon-si (KR); Dong Hun Lee, Ansan-si (KR); Won Kuk Kim, Seoul (KR); Woo Ram Chung, Seoul (KR); Kyu Sun Han, Suwon-si (KR); Suk Hoon Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/838,806

(22) Filed: Aug. 28, 2015

(65) Prior Publication Data

US 2015/0367512 A1    Dec. 24, 2015

Related U.S. Application Data

(63) Continuation of application No. 13/404,674, filed on Feb. 24, 2012, now Pat. No. 9,149,167.

(30) Foreign Application Priority Data

Jun. 28, 2011 (KR) ................ 10-2011-0063285

(51) Int. Cl.
*B25J 9/16* (2006.01)
*A47L 9/00* (2006.01)
(Continued)

(52) U.S. Cl.
CPC ............ *B25J 9/1664* (2013.01); *A47L 9/009* (2013.01); *B25J 5/00* (2013.01); *B25J 9/0003* (2013.01);
(Continued)

(58) Field of Classification Search
None
See application file for complete search history.

(56) References Cited

U.S. PATENT DOCUMENTS 5,353,224 A * 10/1994 Lee ................ A47L 11/4011
180/167
2004/0211444 A1* 10/2004 Taylor ............... A47L 9/2805
134/18
(Continued)

FOREIGN PATENT DOCUMENTS

EP    1554966    7/2005
JP    1-112312   5/1989
(Continued)

OTHER PUBLICATIONS

Chinese Office Action dated Nov. 9, 2015 in Chinese Patent Application No. 201210092067.3.
(Continued)

*Primary Examiner* — Rami Khatib
*Assistant Examiner* — Gerrad A Foster
(74) *Attorney, Agent, or Firm* — Staas & Halsey LLP

(57) ABSTRACT

A robot cleaner which does not stop to change a traveling direction thereof, and a control method thereof includes setting a territory about which cleaning will be performed based on position data acquired during traveling about a cleaning area, predetermining a cleaning path to clean the territory about which cleaning will be performed, and if the cleaning path includes a zigzag traveling path, changing the traveling direction of the robot cleaner by executing curved
(Continued)

traveling of the robot cleaner during traveling along the zigzag traveling path, thus decreasing the time required to clean an area during a change of the traveling direction of the robot cleaner.

16 Claims, 19 Drawing Sheets

(51) Int. Cl.
    *B25J 5/00*       (2006.01)
    *B25J 9/00*       (2006.01)
    *B25J 11/00*     (2006.01)
    *G05D 1/02*     (2006.01)

(52) U.S. Cl.
    CPC ........ *B25J 11/0085* (2013.01); *G05D 1/0223* (2013.01); *G05D 1/0246* (2013.01); *G05D 1/0274* (2013.01); *A47L 2201/00* (2013.01); *A47L 2201/04* (2013.01); *A47L 2201/06* (2013.01); *G05D 2201/0203* (2013.01); *Y10S 901/01* (2013.01)

(56) References Cited

U.S. PATENT DOCUMENTS

2009/0126143 A1* 5/2009 Haegermarck ........... A47L 9/00
                                                        15/319
2009/0234499 A1   9/2009 Nielsen et al.

FOREIGN PATENT DOCUMENTS

| KR | 10-2006-0014715 | 2/2006 |
| KR | 10-2006-0081131 | 7/2006 |
| KR | 10-2008-0090925 | 10/2008 |
| KR | 10-2009-0121092 | 11/2009 |
| KR | 10-2010-0100520 | 9/2010 |
| KR | 10-2011-0054839 | 5/2011 |

OTHER PUBLICATIONS

Korean Office Action dated Apr. 23, 2015 from Korean Patent Application No. 10-2011-0063285, 19 pages.
US Notice of Allowance mailed Jun. 5, 2015 in U.S. Appl. No. 13/404,674.
US Office Action mailed Feb. 6, 2015 in U.S. Appl. No. 13/404,674.
US Office Action mailed Aug. 20, 2014 in U.S. Appl. No. 13/404,674.
US Office Action mailed Nov. 29, 2013 in U.S. Appl. No. 13/404,674.
U.S. Appl. No. 13/404,674, filed Feb. 24, 2012, Jun Pyo Hong, et al., Samsung Electronics Co., Ltd.
Chinese Office Action dated Jul. 20, 2016 in Chinese Patent Application No. 201210092067.3.
Chinese Notification of Grant dated Jan. 22, 2017 in Chinese Patent Application No. 20120092067.3.

\* cited by examiner

ROBOT CLEANER AND CONTROL METHOD THEREOF

CROSS-REFERENCE TO RELATED APPLICATIONS

This application is a continuation of U.S. patent application Ser. No. 13/404,674, filed on Feb. 24, 2012, which claims the priority benefit of Korean Patent Application No. 10-2011-0063285, filed on Jun. 28, 2011 in the Korean Intellectual Property Office, the disclosures of which are incorporated herein by reference.

BACKGROUND

1. Field

The following description relates to a robot cleaner which effectively travels about a cleaning area and a control method thereof.

2. Description of the Related Art

In general, a robot cleaner is an apparatus which cleans a designated cleaning area, such as a house or an office, while autonomously traveling about the cleaning area. The robot cleaner includes, in addition to elements of a vacuum cleaning device to draw in dust or foreign substances, a traveling device allowing the robot cleaner to travel, an obstacle sensor to sense obstacles, a battery to supply power, and a microprocessor to control the overall operation of the robot cleaner.

The robot cleaner, through the above-described configuration, judges distances to various obstacles installed in the cleaning area, and executes cleaning while traveling so as not to collide with the obstacles using the judged information. Such a robot cleaner is designed to autonomously recognize the cleaning area so as to execute cleaning of the entire designated cleaning area and to divide already cleaned regions and non-cleaned regions from each other so as to thoroughly clean the cleaning area.

Cleaning using the robot cleaner is carried out using a random sweep method, a pattern sweep method, and a cell sweep method. In the random sweep method, a motion, such as rotation or straight traveling, is randomly determined based only on obstacle information recognized by the obstacle sensor. In the pattern sweep method, whether or not an obstacle is present is judged using information recognized by the obstacle sensor, a position of the robot cleaner is recognized, and thus the robot cleaner executes cleaning while traveling along a specific pattern. In the cell sweep method, a cleaning area is predetermined and the predetermined cleaning area is cleaned using the pattern sweep method.

The above-described robot cleaner stops to change a traveling direction thereof during traveling, and the amount of time required to clean an area increases as the number of times that the robot cleaner stops increases.

SUMMARY

Therefore, it is an aspect to provide a robot cleaner which does not stop to change a traveling direction thereof, decreasing the amount of time required to clean an area, and a control method thereof.

Additional aspects will be set forth in part in the description which follows and, in part, will be obvious from the description, or may be learned by practice of the invention.

In accordance with one aspect, a control method of a robot cleaner includes setting a territory about which cleaning will be performed based on position data acquired during traveling about a cleaning area, predetermining a cleaning path to clean the territory about which cleaning will be performed, and if the cleaning path includes a zigzag traveling path, changing the traveling direction of the robot cleaner by executing curved traveling of the robot cleaner without stopping during traveling along the zigzag traveling path.

The control method may further include, if an obstacle is sensed during traveling along the cleaning path, allowing the robot cleaner to travel around the obstacle using a wall following method and, when the robot cleaner reaches a scheduled traveling line during traveling using the wall following method, allowing the robot cleaner to move along the traveling line.

The control method may further include storing a cleaned region during traveling about the cleaning area, and if the robot cleaner executes curved traveling around the cleaned region, setting a traveling section such that a region of curved traveling overlaps with the cleaned region.

The setting of the territory about which cleaning will be performed based on the position data acquired during traveling about the cleaning area may include storing data regarding an initial position where traveling of the robot cleaner begins and positions where the traveling direction of the robot cleaner is changed during traveling about the cleaning area, and setting the territory about which cleaning will be performed based on the initial position and the positions where the traveling direction of the robot cleaner is changed.

The control method may further include dividing the territory about which cleaning will be performed into cleaning blocks having a designated size.

The cleaning blocks may include information regarding a first indicator indicating presence of an obstacle, a second indicator indicating completion of cleaning of a block, and a third indicator indicating completion of cleaning of one line including a current block and the lower lines.

The control method may further include extracting a plurality of feature points from the surrounding environment around the cleaning area, and generating a feature map using the plurality of feature points.

The change of the traveling direction of the robot cleaner by executing curved traveling of the robot cleaner may include reducing moving velocity of the robot cleaner to a designated velocity during movement of the robot cleaner along a straight path part of the zigzag traveling path, and controlling rotating velocity of the robot cleaner, while constantly maintaining the reduced moving velocity, so as to execute curved traveling of the robot cleaner.

The change of the traveling direction of the robot cleaner by executing curved traveling of the robot cleaner may include controlling rotating velocity of the robot cleaner simultaneously with controlling moving velocity of the robot cleaner during movement of the robot cleaner along the zigzag traveling path, so as to execute curved traveling of the robot cleaner without stopping.

In accordance with another aspect, a robot cleaner includes an input unit to select a cleaning mode using a path map, a path map generation unit to set a territory about which cleaning will be performed based on position data acquired during traveling about a cleaning area and to predetermine a cleaning path to clean the territory about which cleaning will be performed, if the cleaning mode using the path map is selected, and a control unit to control curved traveling of the robot cleaner without stopping to change the traveling direction of the robot cleaner during movement along a zigzag traveling path, if the cleaning path includes the zigzag traveling path.

The robot cleaner may further include an obstacle sensing unit including an ultrasonic sensor or an optical sensor to sense an obstacle located in the cleaning area.

If the obstacle sensing unit senses the obstacle during movement along the cleaning path, the obstacle sensing unit may transmit information regarding sensing of the obstacle to the control unit, and if the control unit receives the information regarding sensing of the obstacle, the control unit may allow the robot cleaner to travel around the obstacle using a wall following method and, when the robot cleaner reaches a scheduled traveling line during traveling using the wall following method, allow the robot cleaner to move along the traveling line.

The path map generation unit may store data regarding an initial position where traveling of the robot cleaner begins and positions where the traveling direction of the robot cleaner is changed during traveling about the cleaning area, and set the territory about which cleaning will be performed based on the initial position and the positions where the traveling direction of the robot cleaner is changed.

The robot cleaner may further include a feature map generation unit to extract a plurality of feature points from the surrounding environment around the cleaning area and to generate a feature map using the plurality of feature points.

The robot cleaner may further include a position measurement unit including at least one of an encoder connected to drive wheels of the robot cleaner to sense rotating velocity of the robot cleaner, a gyro sensor to measure a direction angle of the robot cleaner using rotation inertia, and an acceleration sensor to measure acceleration of the robot cleaner.

The robot cleaner may further include a memory to store the path map, information regarding the obstacle sensed during movement along the path map, and information regarding whether or not respective cleaning of cleaning blocks has been completed.

In accordance with another aspect, a control method of a robot cleaner includes setting a territory about which cleaning will be performed based on position data acquired during traveling about a cleaning area, predetermining a cleaning path to clean the territory about which cleaning will be performed, and if the cleaning path includes a zigzag traveling path, setting in advance the path so as to allow the robot cleaner to execute curved traveling without stopping at positions of the zigzag traveling path where the traveling direction of the robot cleaner is changed.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
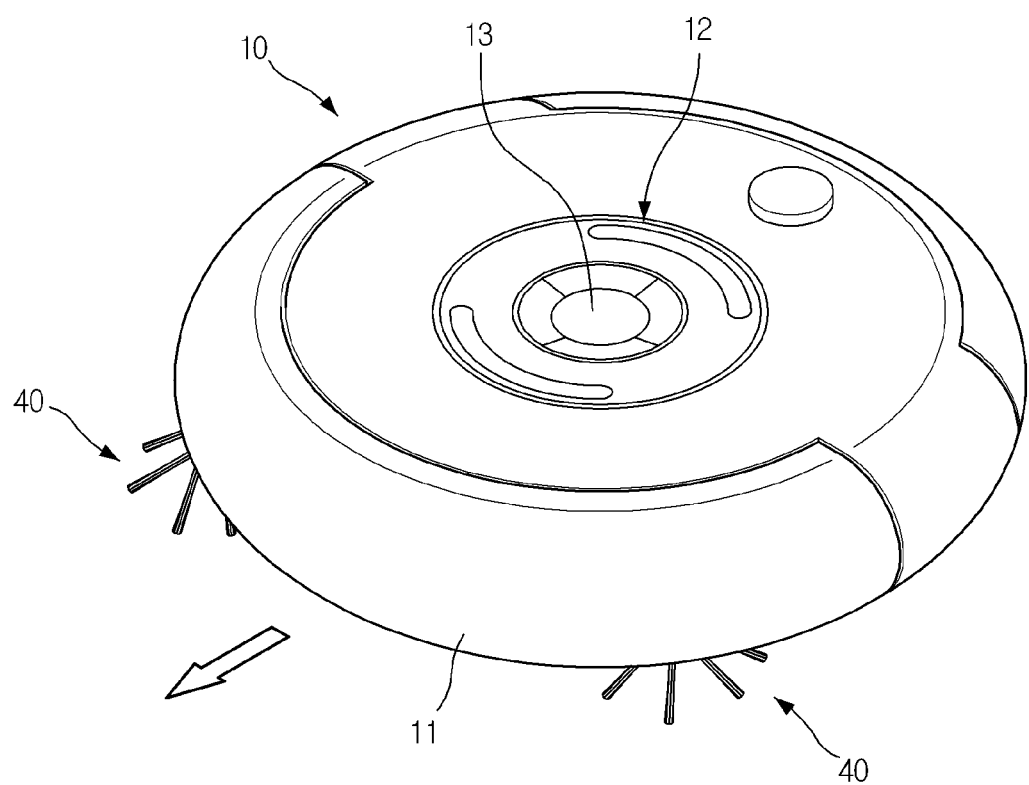
FIG. 1 is a perspective view illustrating the external appearance of a robot cleaner in accordance with one embodiment.

Reference will now be made in detail to embodiments, examples of which are illustrated in the accompanying drawings, wherein like reference numerals refer to like elements throughout.

Figure 2:
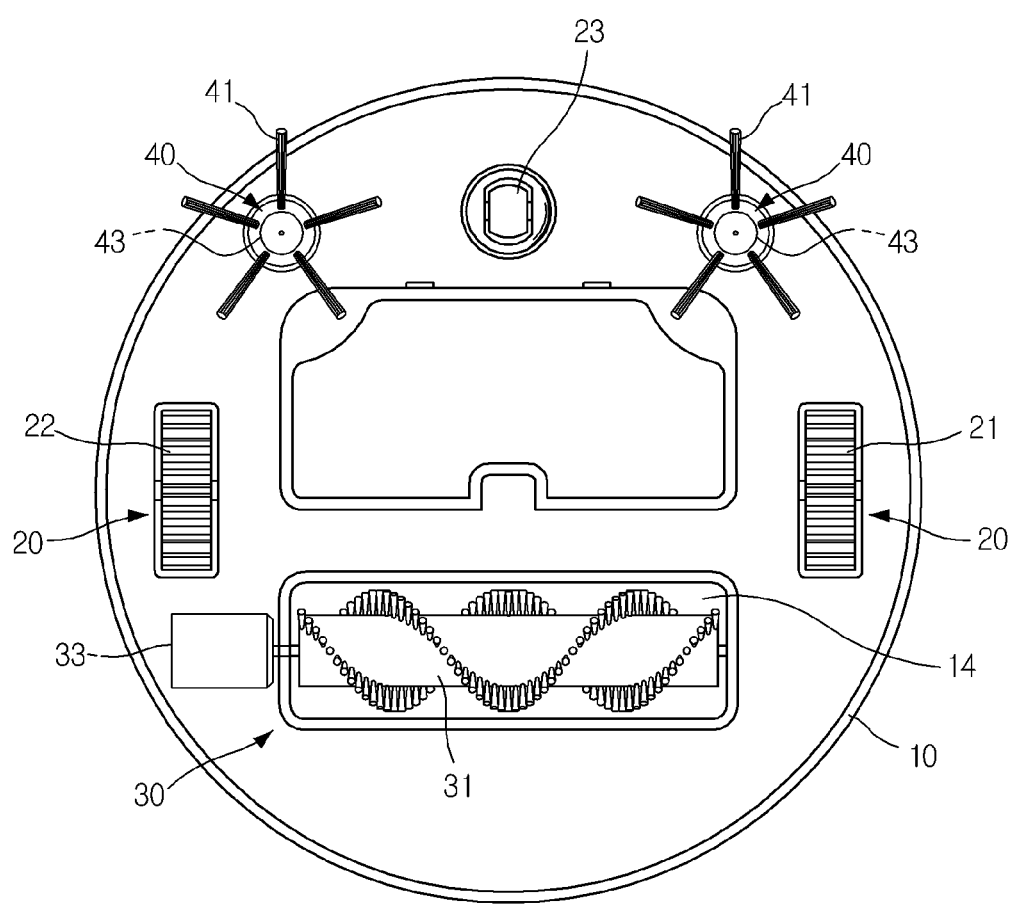
FIG. 2 is a bottom view of the robot cleaner in accordance with the embodiment.

FIG. 1 is a perspective view illustrating the external appearance of a robot cleaner in accordance with one embodiment, and FIG. 2 is a bottom view of the robot cleaner in accordance with the embodiment.

As shown in FIGS. 1 and 2, a robot cleaner 1 in accordance with the embodiment includes a main body 10 forming an external appearance of the robot cleaner 1, a driving device 20 installed on the lower portion of the main body 10 to move the robot cleaner 1, and a brush device 30 and 40 to sweep or remove dust from a floor on which the robot cleaner 1 travels so as to perform cleaning.

In addition to the driving device 20 and the brush device 30 and 40, a contact sensor and a proximity sensor to sense obstacles may be installed on the main body 10. For example, an optical sensor installed within a bumper 11 installed on the front part of the main body 10 may be used to sense an obstacle, such as a wall, for example, and an infrared sensor (or an ultrasonic sensor) installed on the bottom of the main body 10 may be used to sense an obstacle, such as a staircase, for example. Further, a vision sensor 13 to photograph the surrounding environment may be installed at the upper portion of the main body 10.

A display 12 to inform a user of a state or operation of the robot cleaner 1 may be further installed on the main body 10.

The driving device 20 includes a pair of driving wheels 21 and 22 installed at both sides of the central portion of the main body 10 to adjust movement of the robot cleaner 1, and a caster wheel 23 rotatably installed at the front part of the main body 10 to change a rotating angle thereof according to conditions of the floor, on which the robot cleaner 1 moves. The caster wheel 23 is used to stabilize the pose of the robot cleaner 1 or to prevent the robot cleaner 1 from falling. The caster wheel 23 may include a wheel in the shape of a roller or a caster.

The driving wheels 21 and 22 may be driven forward or backward to move the robot cleaner 1. The driving wheels 21 and 22 are driven forward or backward, thus moving the robot cleaner 1 forward or backward. When the right driving wheel 22 is driven forward while the left driving wheel 21 is driven backward, the robot cleaner 1 may be rotated counter-clockwise as seen looking down on the top part of the robot cleaner 1. On the other hand, when the right driving wheel 22 is driven backward while the left driving wheel 21 is driven forward, the robot cleaner 1 may be rotated clockwise as seen looking down on the top part of the robot cleaner 1.

The brush device 30 and 40 includes a main brush unit 30 provided adjacent to an inlet 14 formed on the bottom surface of the main body 10 to sweep or disperse dust from the floor so as to improve inhalation efficiency, and side brush units 40 installed at both sides of the front portion of the bottom surface of the main body 10 to sweep dust from the floor, on which the robot cleaner 1 travels, toward the inlet 14.

The main brush unit 30 includes a drum-shaped rotary brush 31 (hereinafter, referred to as "a main brush") having a length corresponding to the inlet 14, disposed in the horizontal direction adjacent to the inlet 14 and rotated in a roller type with respect to the floor so as to sweep or disperse dust from the floor, and a main brush motor 33 to rotate the main brush 31.

Each side brush unit 40 includes a side brush 41 to sweep or disperse dust from the floor, and a side brush motor 43 to rotate the side brush 41.

The robot cleaner 1 may further include a dust collecting device to draw in and store foreign substances, such as dust.

Figure 3:
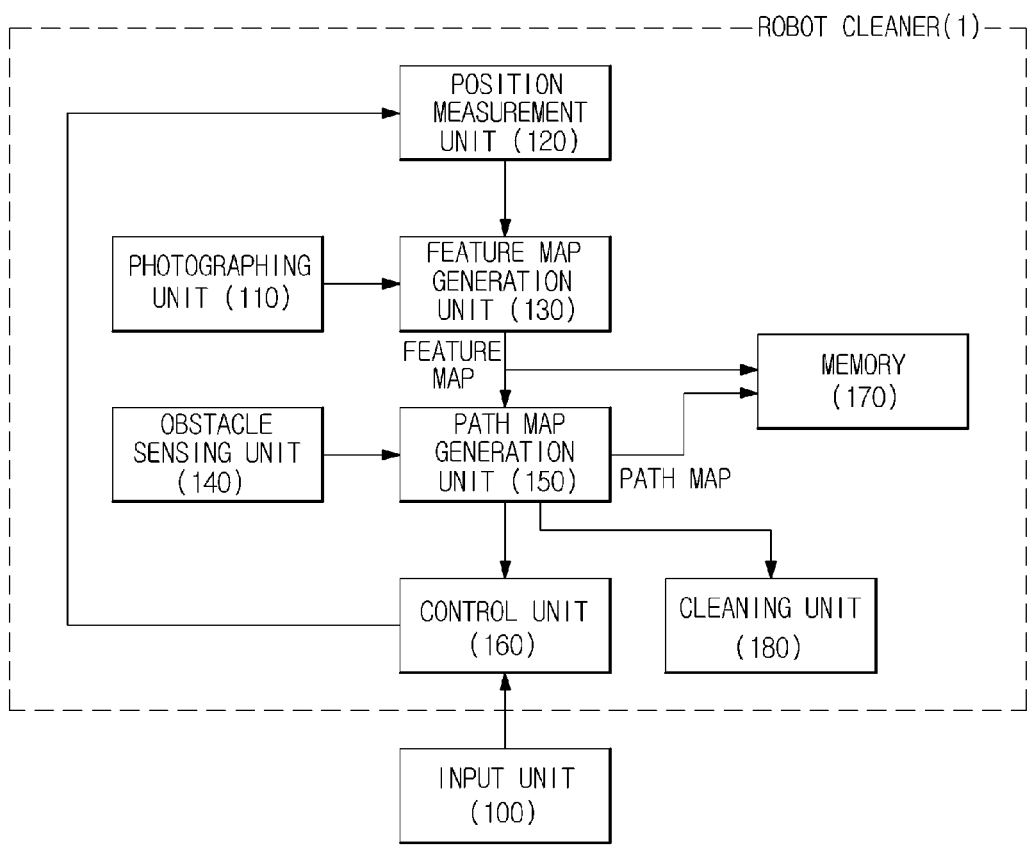
FIG. 3 is a block diagram of a control system of the robot cleaner in accordance with the embodiment.

FIG. 3 is a block diagram of a control system of the robot cleaner in accordance with the embodiment.

The robot cleaner 1 includes an input unit 100, a photographing unit 110, a position measurement unit 120, a feature map generation unit 130, an obstacle sensing unit 140, a path map generation unit 150, a control unit 160, a memory 170, and a cleaning unit 180.

The input unit 100 receives a traveling mode command input by a user. Traveling modes include a traveling mode using a path map and a traveling mode not using a path map. In the traveling mode using a path map, a cleaning path is used, and the robot cleaner 1 executes a cleaning while moving along the set cleaning path. In the traveling mode not using a path map, the robot cleaner 1 executes a cleaning while randomly moving in a random traveling method. Here, the random traveling method may be a method in which rotation or straight traveling of the robot cleaner 1 is randomly determined by judging only whether or not an obstacle is present.

The photographing unit 110 captures a surrounding image to extract feature points. The surrounding image may include a ceiling, wall, or floor image, for example. The ceiling image, having a lower possibility of image change, may be the most useful as the surrounding image. Hereinafter, the image of the ceiling used as the surrounding image will be described.

The photographing unit 110 may be implemented by a charge coupled device (CCD), a complementary metal oxide semiconductor (CMOS), or other image capturing devices. The photographing unit 110 may be implemented by an analog-to-digital converter which converts an analog signal of a captured image into a digital signal.

The position measurement unit 120 is implemented by a relative position recognition module including an encoder, a gyro sensor, and an acceleration sensor, and measures the position of the robot cleaner 7. The encoder is connected to the driving wheels 21 and 22 and senses a rotating velocity of the driving wheels 21 and 22. When integration of the rotating velocity sensed by the encoder is performed, position (or moving distance) and direction angle of the robot cleaner 1 are acquired. The gyro sensor may measure the direction angle of the robot cleaner 1 using rotation inertia. The acceleration sensor may measure the position of the robot cleaner 1 by performing a double integration of acceleration of the robot cleaner 1.

Figure 4:
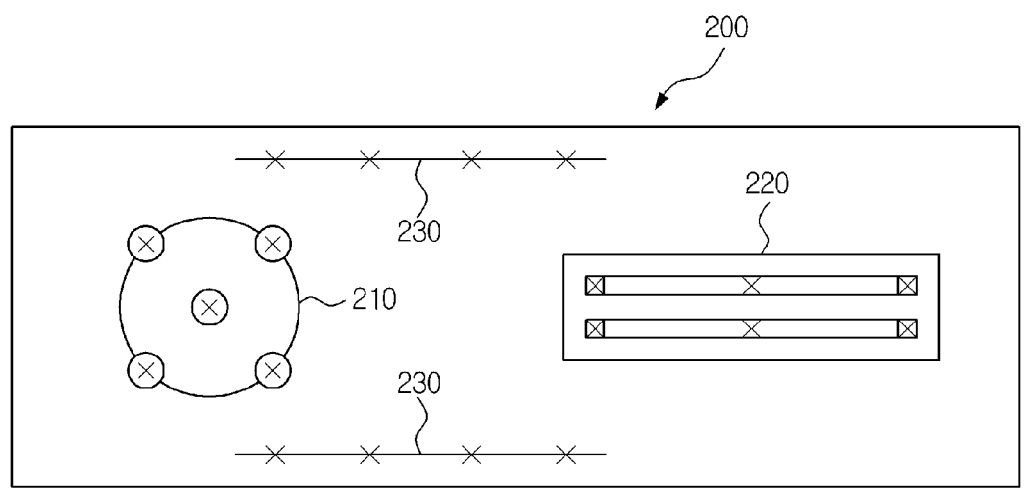
FIG. 4 is a view illustrating a concept of feature point extraction using a ceiling image.

The feature map generation unit 130 extracts a plurality of feature points from the ceiling image captured by the photographing unit 110 and then generates a feature map. The feature map includes feature points constantly measured from the surrounding environment. The feature points may include points representing inherent features of specific positions. With reference to FIG. 4, a ceiling image 200 may include detailed sub-images, such as a chandelier 210, a fluorescent light 220, and corner parts 230, distinguished from other positions. After feature points are marked on these detailed sub-images, when a feature point identical to one of the above feature points is detected from an image captured during movement of the robot cleaner 1, the pose (position and direction angle) of the robot cleaner 1 may be acquired.

Figure 5:
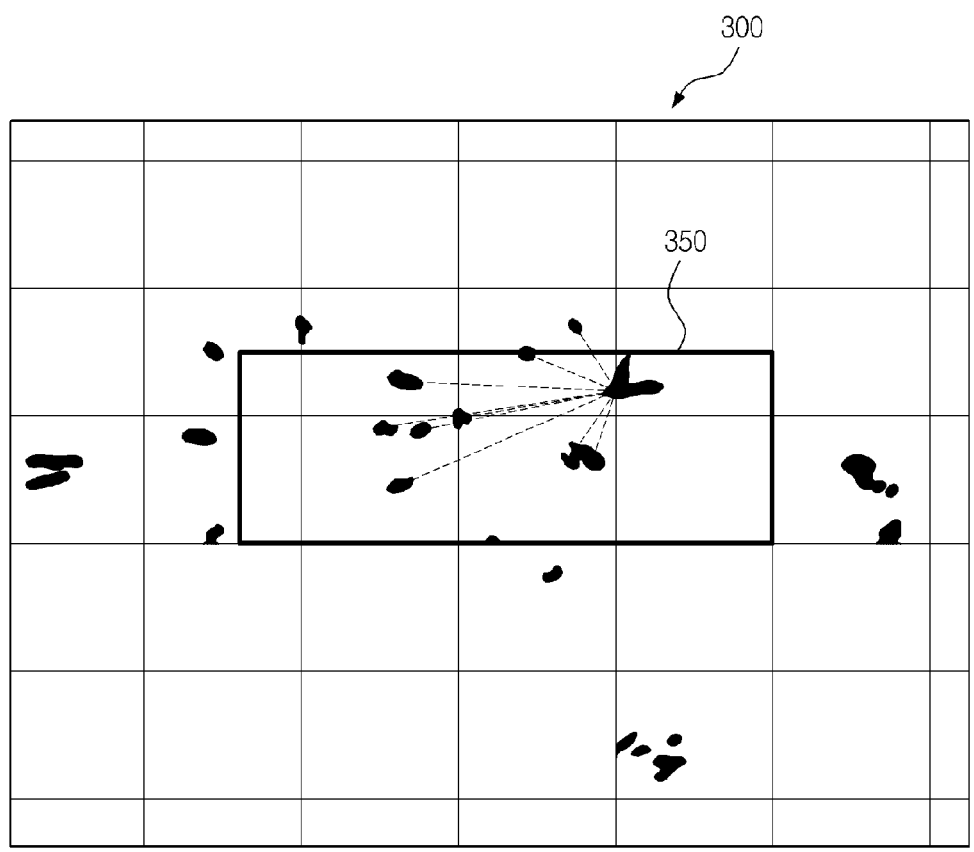
FIG. 5 is a view illustrating an example of a feature map which is actually built.

FIG. 5 is a view illustrating an example of a feature map which was actually created. A feature map 300 includes feature points having various shapes, and the feature points adjacent to each other are connected. If a combination of the feature points defined in advance is detected from an image 350 photographed by the robot cleaner 1, the position and direction angle of the robot cleaner 1 may be acquired. Algorithms to extract the above-described feature points may include a scale invariant feature transform (SIFT), a descriptor, or a Harris corner detector, for example. Of course, other simultaneous localization and mapping (SLAM) techniques, such as radio frequency identification (RFID) or a range finder using structure light, for example, may be used. Here, SLAM is an algorithm in which localization and mapping of the robot cleaner 1 are simultaneously performed.

The feature map generation unit 130 makes the position measured by the position measurement unit 120 correspond to the feature points obtained from the ceiling image, thus completing the feature map. After completion of the feature map, the position and direction angle of the robot cleaner 1 may be easily acquired through comparison between feature points obtained from the photographed image and the feature map.

The memory 170 stores the map generated by the feature map generation unit 130. The memory 170 may be implemented by a storage medium selected from among a non-volatile memory device, such as a ROM, a RAM, a PROM, an EPROM, or a flash memory, a volatile memory device, such as a RAM, a hard disc, and an optical disc, or other different types known to those skilled in the art.

The obstacle sensing unit 140 senses an obstacle adjacent to the robot cleaner 1 during movement of the robot cleaner 1. The obstacle sensing unit 140 may be implemented using an ultrasonic sensor or an optical sensor. If the obstacle sensing unit 140 is implemented by the ultrasonic sensor, the obstacle sensing unit 140 transmits ultrasonic waves to a path along which the robot cleaner 1 travels and receives reflected ultrasonic waves, thereby sensing an obstacle present on the path. If the obstacle sensing unit 140 is implemented using the optical sensor, an infrared ray emitting device emits infrared rays and an infrared ray receiving device receives reflected infrared rays, thereby sensing an obstacle.

Figure 6:
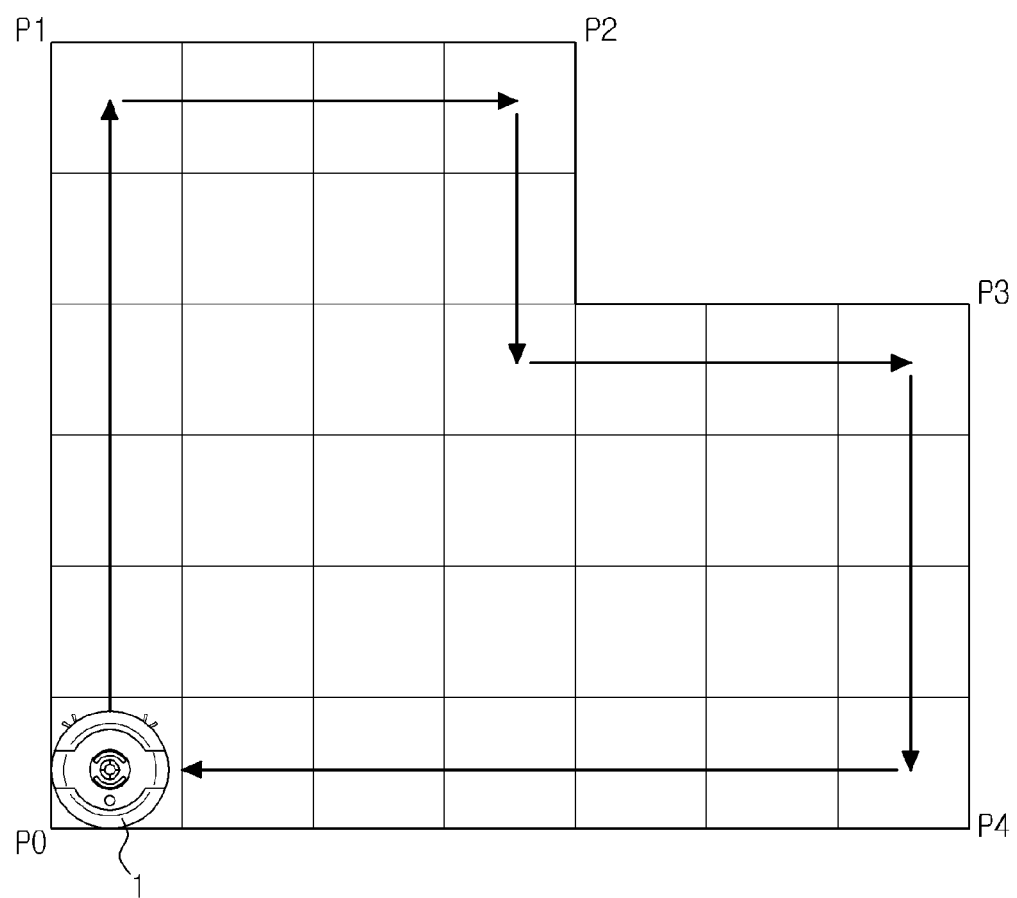
FIG. 6 is a view illustrating a process of building a path map.

The path map generation unit 150 sets a territory about which cleaning will be performed based on position data acquired during traveling about a cleaning area, and sets in advance a cleaning path to clean the territory, thus generating a cleaning path map. With reference to FIG. 6, the path map generation unit 150 causes the robot cleaner 1 to move along walls, stores position data of the outermost portion of the territory about which cleaning will be performed, and thus sets the territory about which cleaning will be performed. In more detail, the path map generation unit 150 stores an initial position "P0", stores data of outer positions "P1 to P4" at which the moving direction of the robot cleaner 1 is changed while moving along the walls, and sets the positions "P0 to P4" to form an outermost cleaning path. The path map generation unit 150 may divide a territory about which cleaning will be performed into cleaning blocks based on the initial position "P0" and the outer positions "P1 to P4", and generate the cleaning path to clean the cleaning blocks while traveling about the cleaning blocks in a specific pattern. Here, the specific pattern means a pattern in which a specific rule is set, such as a zigzag traveling pattern, a wall following pattern, or a spiral traveling pattern, or a plurality of specific patterns may be combined to set a cleaning path.

Figure 7:
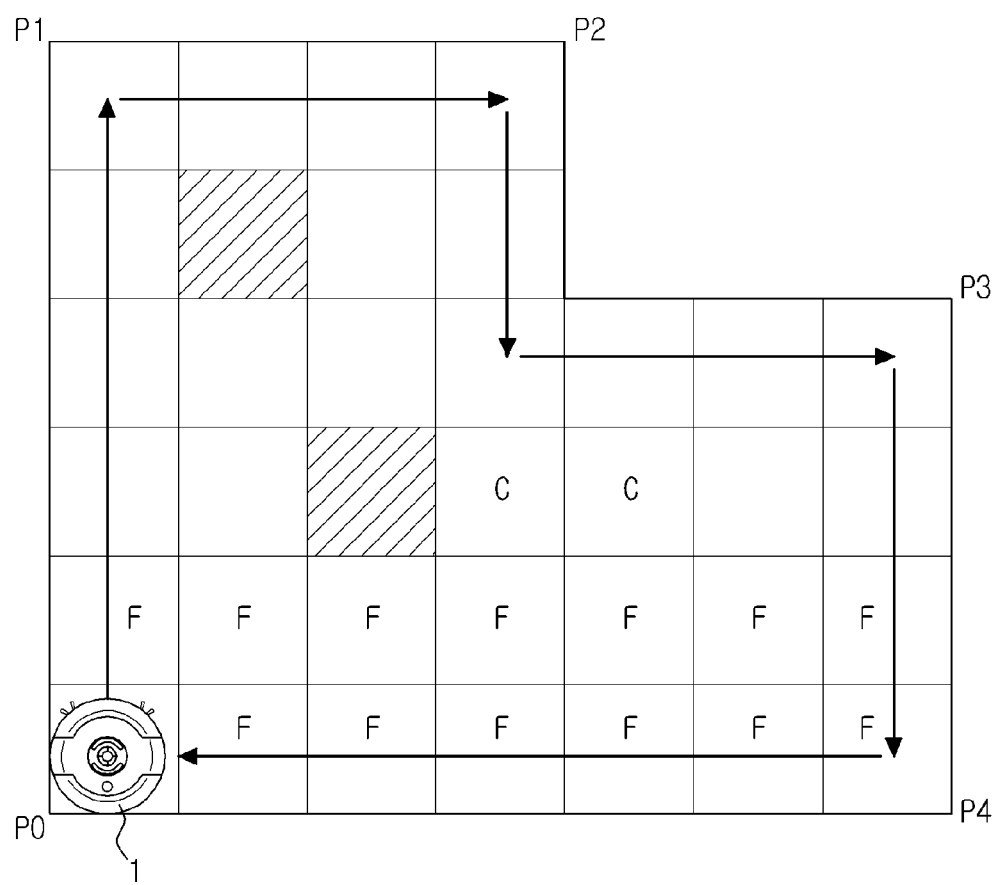
FIG. 7 is a view illustrating information held in cells of the path map.

The width of the cleaning blocks is adjusted such that cleaning is completely carried out in consideration of the size of the main body 10 of the robot cleaner 1. With reference to FIG. 7, the cleaning territory includes cells having a designated size. The cells include information regarding whether or not an obstacle is present or path information. In more detail, the cells may include a first indicator (shadowed) indicating presence of an obstacle, a second indicator (marked by "C" meaning "Cleaned") indicating completion of cleaning of a cell, and a third indicator (marked by "F" meaning "Filled") indicating completion of one line including a current cell and the lower lines.

Figure 8A:
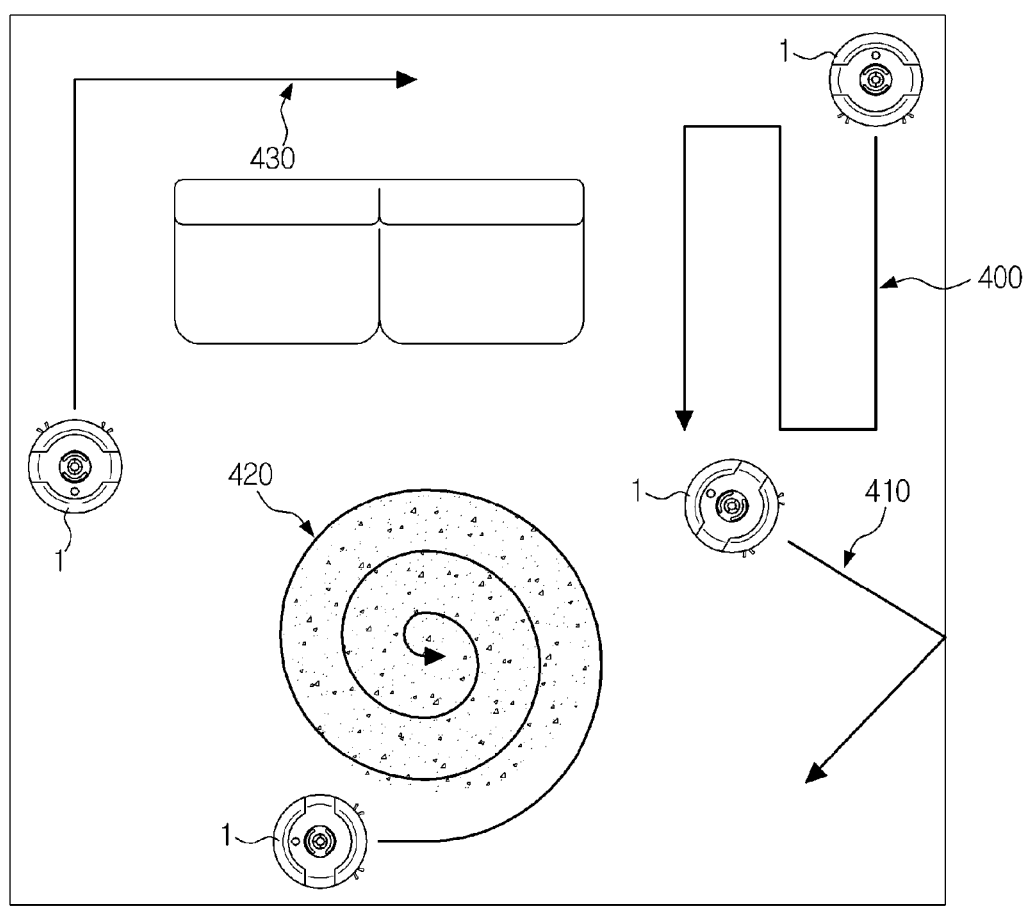
FIG. 8A is a view illustrating an example of a traveling mode not using maps of the robot cleaner in accordance with the embodiment.

When a traveling mode command is input by a user, the control unit 160 controls traveling of the robot cleaner 1 according to a traveling mode, thus executing cleaning. There is a traveling mode that uses maps and a traveling mode that does not use maps. FIG. 8A illustrates operation of the robot cleaner 1 according to the traveling mode not using maps. The traveling mode of the robot cleaner 1 may be variously implemented. For example, the robot cleaner 1 in the traveling mode that does not use maps may travel in various traveling patterns, such as a zigzag traveling pattern 400 causing the robot cleaner 1 to travel in a zigzag shape, a random traveling pattern 410 causing the robot cleaner 1 to randomly travel without a predetermined set shape, a spiral traveling pattern 420 causing the robot cleaner 1 to traveling in a spiral shape, or a wall following traveling pattern 430 causing the robot cleaner 1 to travel while maintaining a designated distance with an object.

Figure 8B:
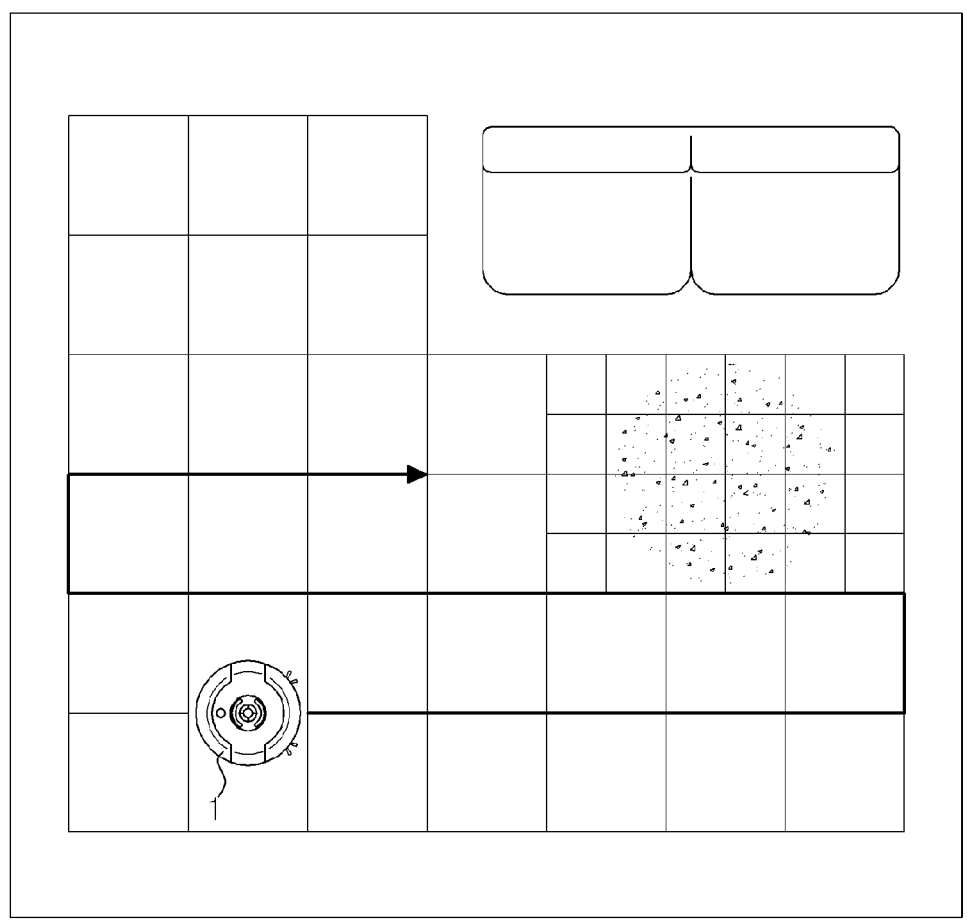
FIG. 8B is a view illustrating an example of a traveling mode using maps of the robot cleaner in accordance with the embodiment.

FIG. 8B illustrates operation of the robot cleaner 1 according to the traveling mode that uses maps. The robot cleaner 1 sets a territory about which cleaning will be performed based on position data acquired during traveling about a cleaning area, and predetermines a cleaning path to clean the territory, thus generating a cleaning path map. FIG. 8B illustrates a cleaning path employing a zigzag traveling path. The zigzag traveling path is a known path along which the robot cleaner 1 travels in a zigzag pattern. Further, in this embodiment, the term "cleaning area" may include the entirety of a space including obstacles which the robot cleaner 1 needs to avoid, and the term "cleaning territory" may include a portion of the cleaning area excluding regions which are not cleaned due to obstacles. One or more cleaning territories may be set within the cleaning area.

Further, various traveling patterns, such as the spiral traveling pattern and the wall following traveling pattern, may be applied to the traveling mode that uses maps, or combinations of multiple traveling patterns may be applied to the traveling mode using maps.

When a user selects the traveling mode that uses maps, the control unit 160 may control traveling of the robot cleaner 1 using the feature map generated by the feature map generation unit 130 and the path map generated by the path map generation unit 150. The control unit 160 may control traveling of the robot cleaner 1 only using the path map without the feature map.

If the robot cleaner 1 desires to change a traveling direction thereof during traveling using the path map, the control unit 160 causes the robot cleaner 1 to change the traveling direction thereof through curved traveling. When the robot cleaner 1 executes curved traveling to change the traveling direction thereof, the time required to clean an area may be decreased. Here, curved traveling may be a traveling method in which the traveling direction of the robot cleaner 1 is changed by controlling angular velocity of the robot cleaner 1 while reducing linear velocity of the robot cleaner 1. Linear velocity may be moving velocity of the robot cleaner 1, and angular velocity may be rotating velocity of the robot cleaner 1. The time at which the robot cleaner 1 starts curved traveling to change the traveling direction thereof, angular velocity control, and deceleration control may be set to optimum values by a designer through experimentation.

Hereinafter, an improvement in coverage according to curved traveling based on a change of the traveling direction of the robot cleaner 1 during traveling of the robot cleaner 1 in the zigzag traveling pattern will be described. However, the embodiment may be applied to all known traveling patterns, in addition to the zigzag traveling pattern.

Figure 9A:
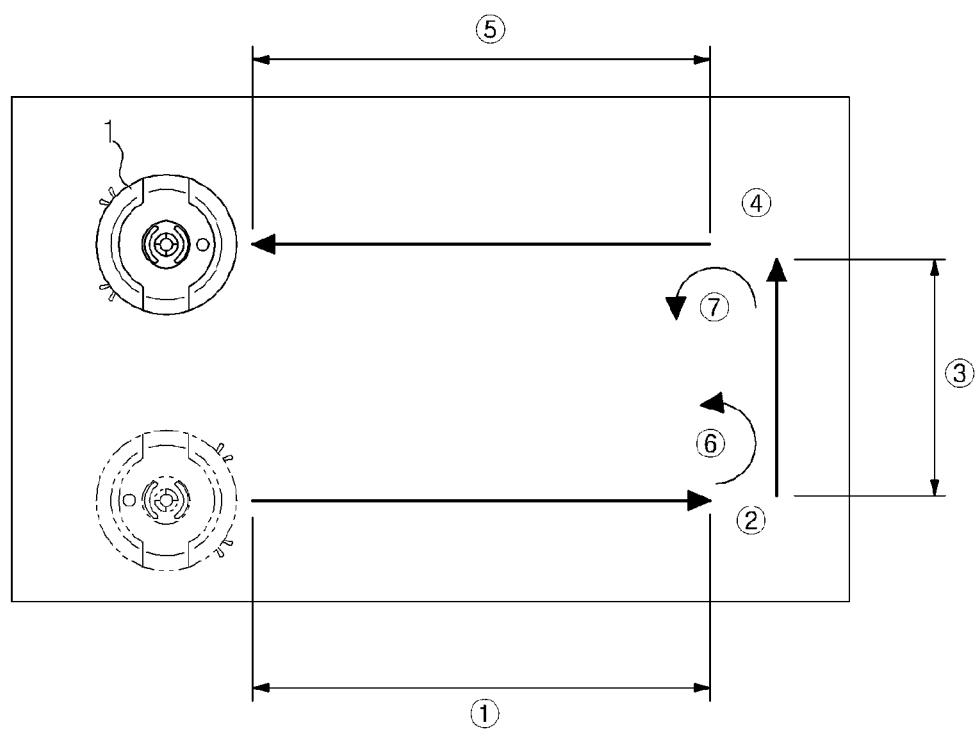
FIG. 9A is a view illustrating a direction change pattern of a conventional robot cleaner.

With reference to FIG. 9A, the control unit 160 executes straight traveling ①→stop ②→rotation ⑥→straight traveling ③→stop ④→rotation ⑤→straight traveling ⑤, thus achieving the zigzag traveling pattern. Here, change of the traveling direction of the robot cleaner 1 is accompanied by stopping.

Figure 9B:
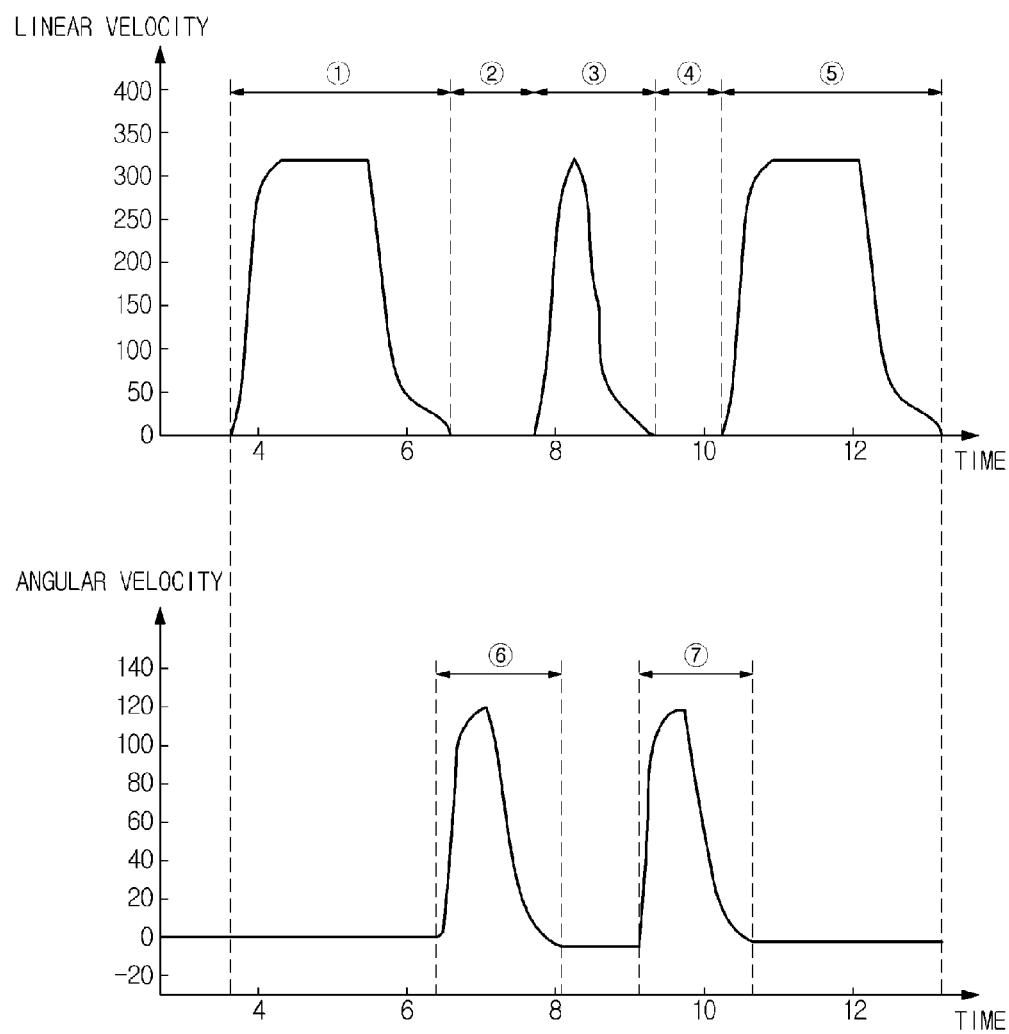
FIG. 9B shows a time-linear velocity graph and a time-angular velocity graph during change of a traveling direction based on the direction change pattern of FIG. 9A.

FIG. 9B shows a time-linear velocity graph and a time-angular velocity graph from straight traveling ① of the robot cleaner 1 in one direction to straight traveling ⑤ of the robot cleaner 1 in another direction in FIG. 9A. It is understood that time until completion of the final straight traveling in FIG. 9B is longer than that in FIG. 10B.

Figure 10A:
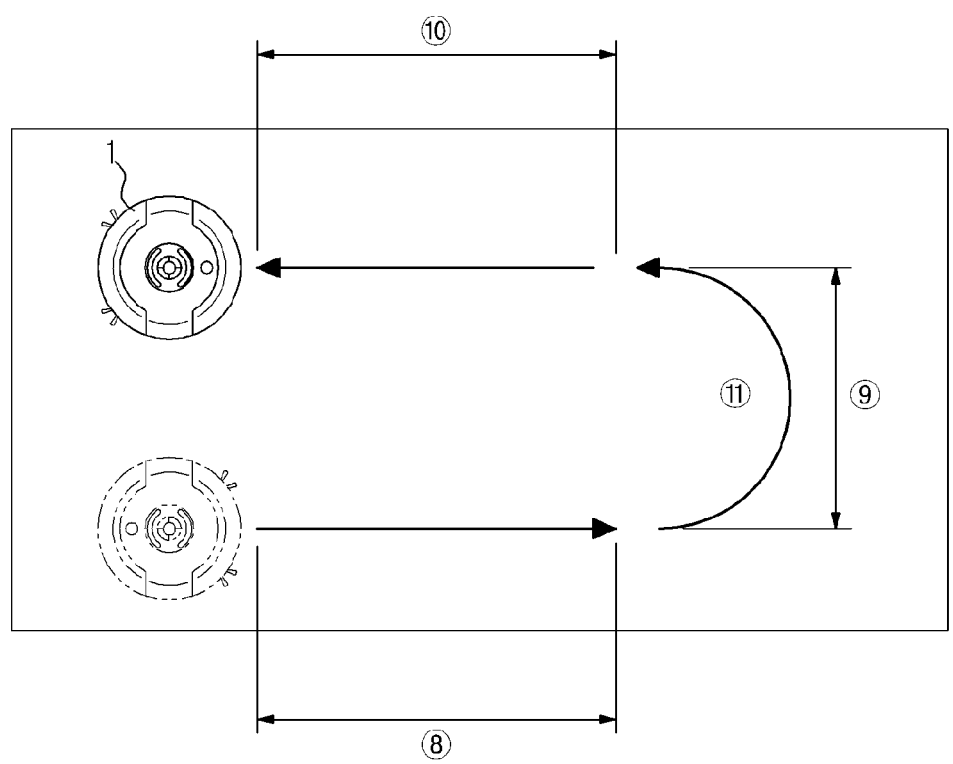
FIG. 10A is a view illustrating a direction change pattern of the robot cleaner in accordance with the embodiment.

With reference to FIG. 10A, the control unit 160 executes straight traveling ⑧→curved traveling ⑨, ⑪→straight traveling ⑩, thus achieving the zigzag traveling pattern. In this case, change of the traveling direction of the robot cleaner 1 is carried out without stopping and thus the time required to clean an area is decreased. Here, during curved traveling ⑨, ⑩, after moving velocity of the robot cleaner 1 is reduced compared to the moving velocity during straight traveling ⑧, rotating velocity of the robot cleaner 1 is controlled while constantly maintaining the reduced moving velocity. However, rotating velocity of the robot cleaner 1 may be controlled while adjusting the moving velocity of the robot cleaner 1, i.e., acceleration→constant velocity→deceleration, during curved traveling ⑨, ⑩. The embodiment includes all cases in which curved traveling of the robot cleaner 1 is carried out without stopping when the traveling direction of the robot cleaner 1 is changed during traveling based on the zigzag traveling pattern. Since change of the traveling direction of the robot cleaner 1 is not accompanied by stopping during curved traveling, the time required to clean an area is decreased.

The control unit 160 may control curved traveling of the robot cleaner 1 using the feature map generated by the feature map generation unit 130 and the position information transmitted from the position measurement unit 120. The control unit 160 acquires position information by comparing image information transmitted from the photographing unit 110 with the feature map, and calculates a position by combining the acquired position information with the position information transmitted from the position measurement unit 120. The control unit 160 may cause the robot cleaner 1 to move along a predetermined cleaning path while acquiring the position information of the robot cleaner 1, and control curved traveling of the robot cleaner 1 using cleaning blocks generated by the path map generation unit 150 if a change of the traveling direction of the robot cleaner 1 is required during movement along the cleaning path. For example, the control unit 160 receives information, such as the width and number of the cleaning blocks, from the path map generation unit 150, reduces the moving velocity of the robot cleaner 1 three blocks before a position where a change of the traveling direction is required, and controls the rotating velocity of the robot cleaner 1 two blocks before the position, thus controlling curved traveling of the robot cleaner 1. Here, control of the moving velocity and rotating velocity to execute curved traveling may be set in advance by a designer using the cleaning blocks.

Figure 10B:
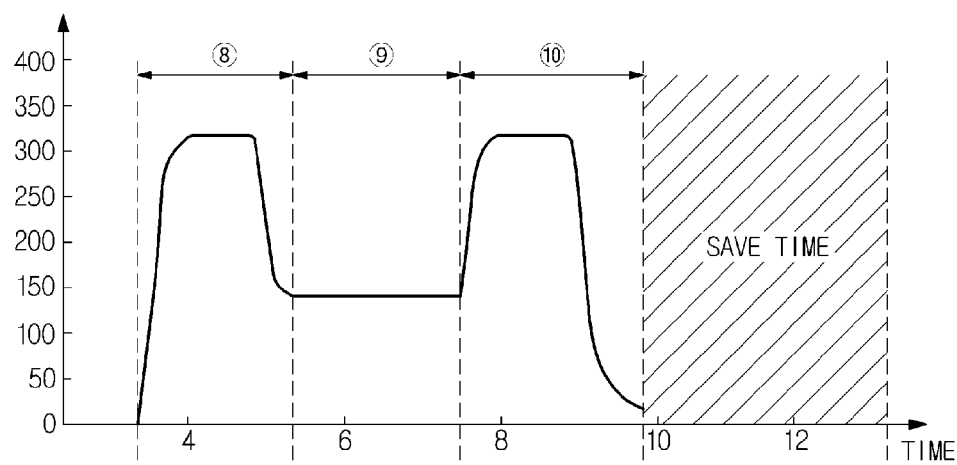
FIG. 10B shows a time-linear velocity graph and a time-angular velocity graph during change of a traveling direction based on the direction change pattern of FIG. 10A.
Figure 10B:
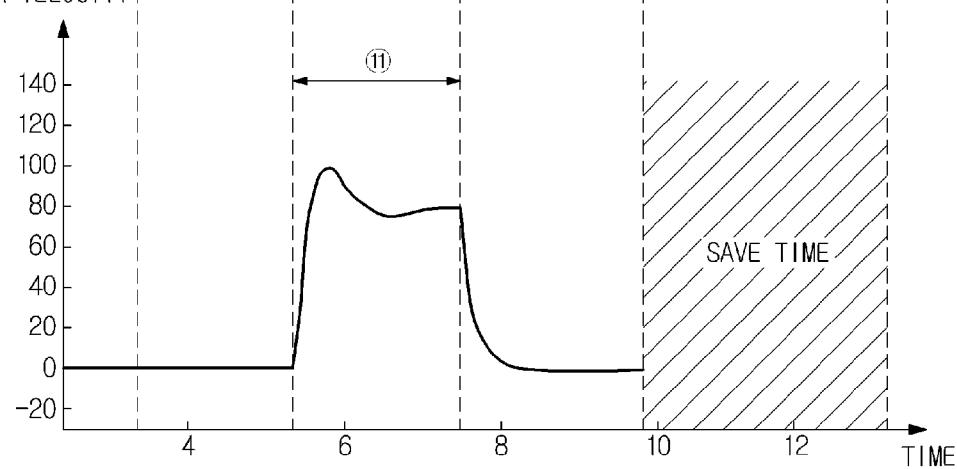

FIG. 10B shows a time-linear velocity graph and a time-angular velocity graph from straight traveling ⑧ of the robot cleaner 1 in one direction to straight traveling ⑩ of the robot cleaner 1 in another direction in FIG. 10A. It is understood that time until completion of the final straight traveling in FIG. 10B is shorter than that in FIG. 9B.

If change of the traveling direction is required while the robot cleaner 1 travels without using a path map, the control unit 160 may cause the robot cleaner 1 to execute curved traveling to change the traveling direction of the robot cleaner 1.

Figure 11:
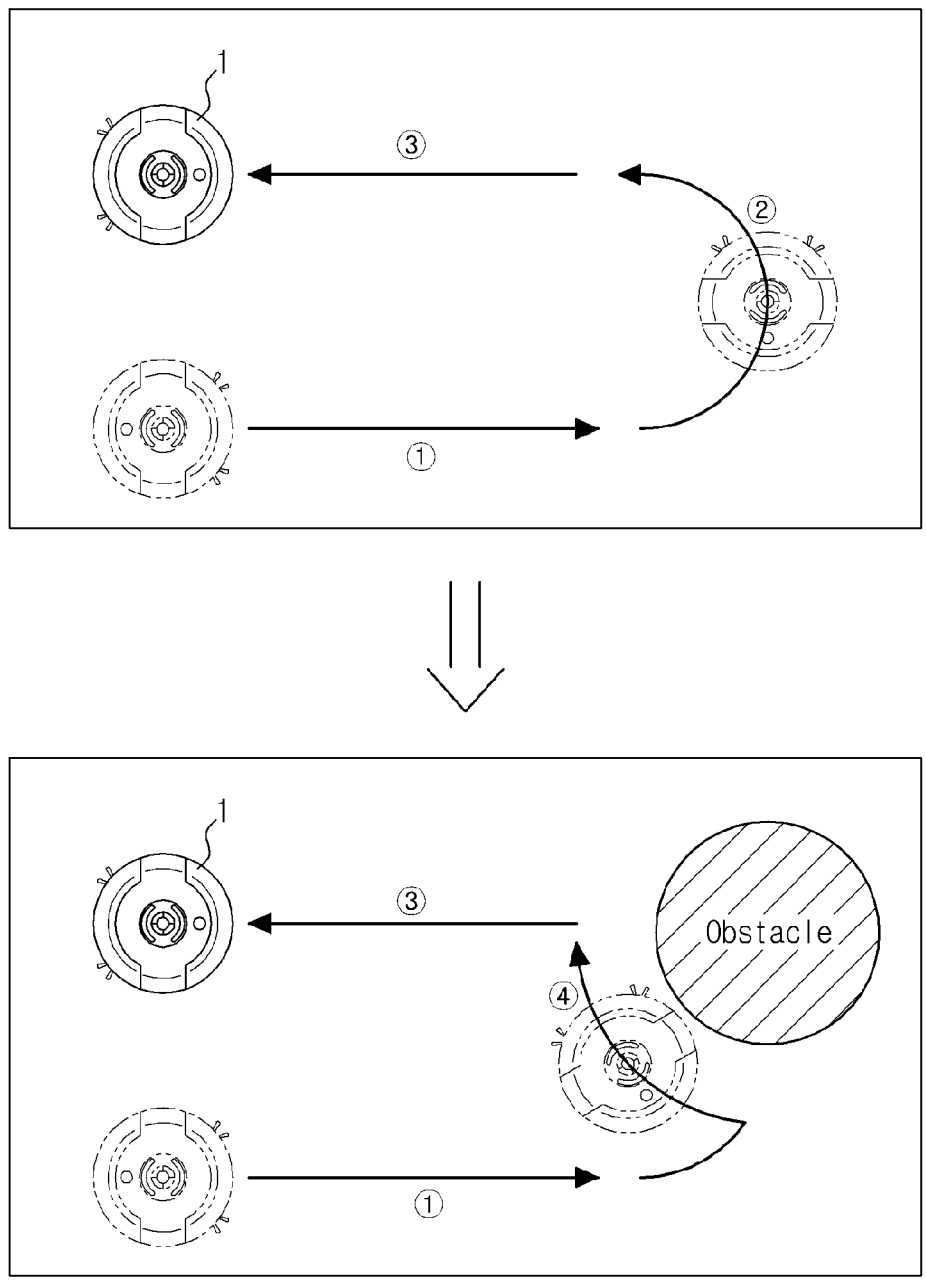
FIGS. 11 and 12 are views respectively illustrating obstacle avoiding methods during change of the traveling direction of the robot cleaner in accordance with the embodiment.

If an obstacle is present on a curved traveling course during change of the traveling direction of the robot cleaner 1 through curved traveling, the control unit 160 causes the robot cleaner 1 to travel while following the obstacle using the wall following method, and, when the robot cleaner 1 reaches a scheduled traveling line during traveling while following the obstacle, causes the robot cleaner 1 to travel along the traveling line. With reference to FIG. 11, when the robot cleaner 1 senses an obstacle during change of the traveling direction of the robot cleaner 1 through curved traveling to change the traveling direction of the robot cleaner 1 by an angle of 180 degrees, the robot cleaner 1 travels while following the obstacle using the wall following method, and, when the robot cleaner 1 reaches a predetermined traveling line ③, moves along the traveling line ③. Here, the scheduled traveling line is the line of ①→②→③, and a changed traveling line is the line of ①→④→③.

Figure 12:
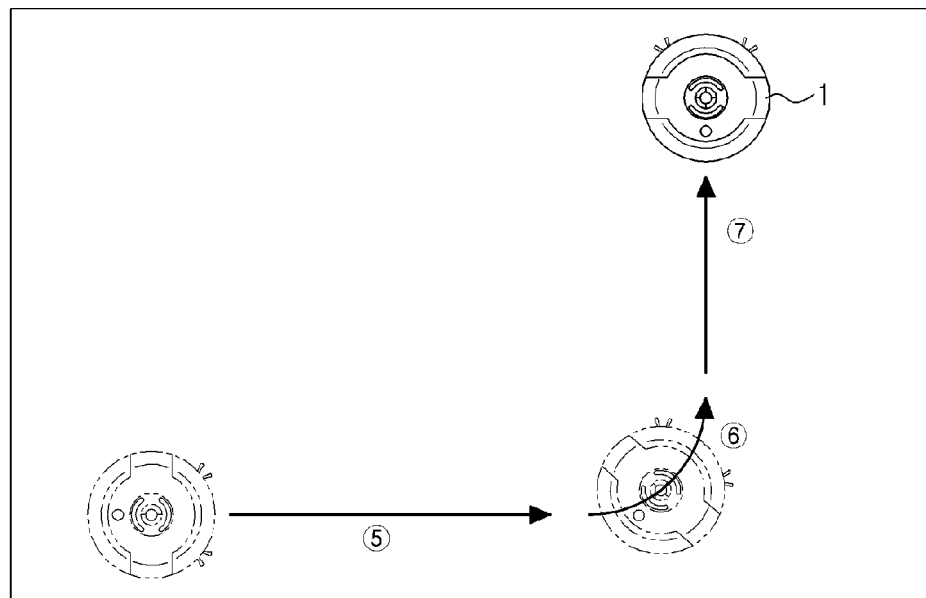
Figure 12:
Figure 12:
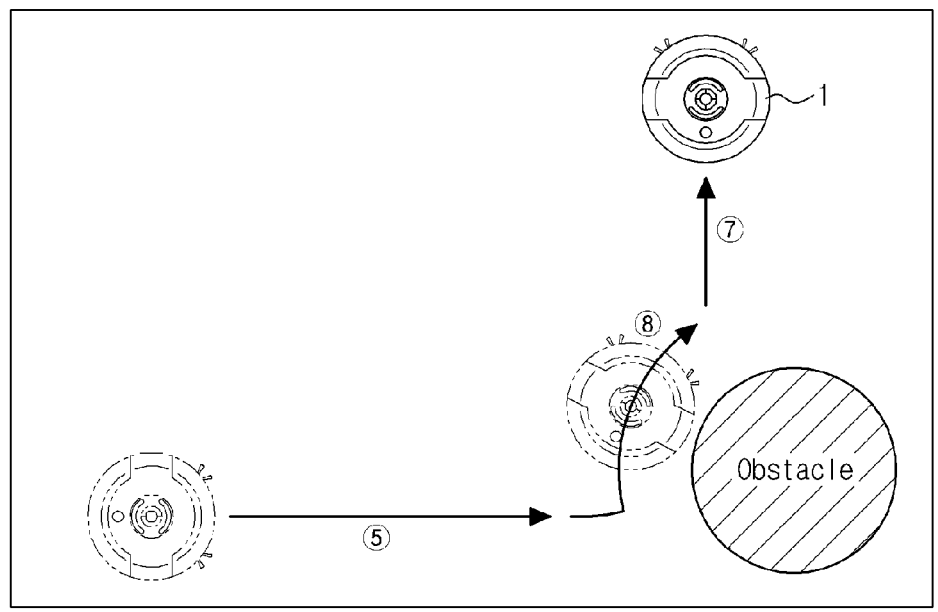

With reference to FIG. 12, when the robot cleaner 1 senses an obstacle during change of the traveling direction of the robot cleaner 1 through curved traveling to change the traveling direction of the robot cleaner 1 by an angle of 90 degrees, the robot cleaner 1 travels while following the obstacle using the wall following method, and, when the robot cleaner 1 reaches a predetermined traveling line ⑦, moves along the traveling line ⑦. Here, the scheduled traveling line is the line of ⑤→⑥→⑦, and a changed traveling line is the line of ⑤→⑧→⑦.

Figure 13:
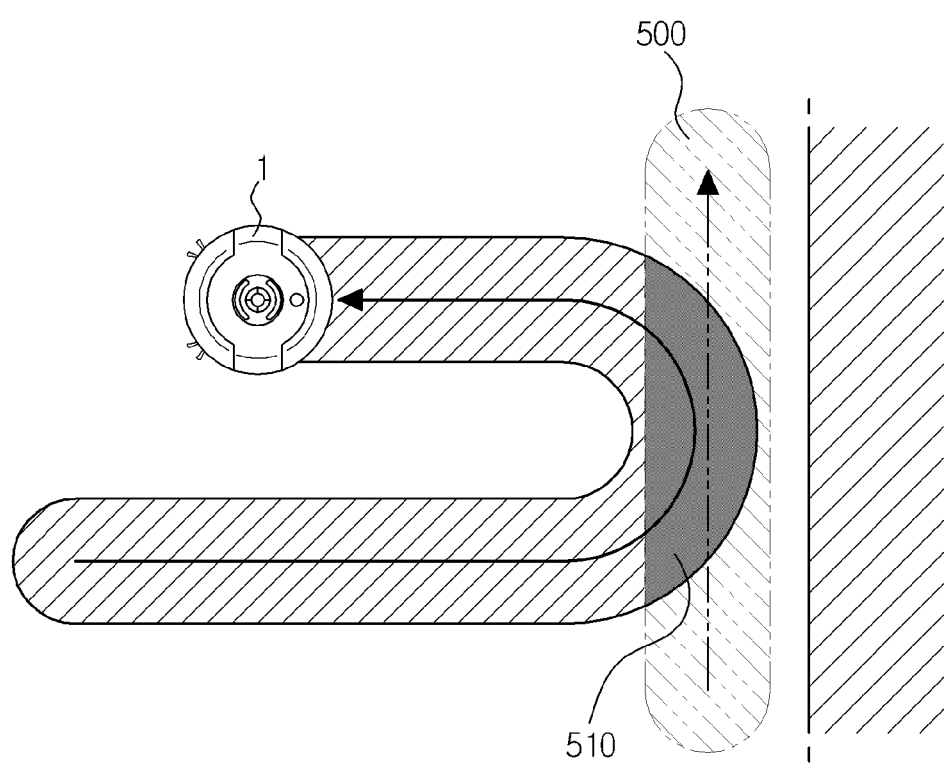
FIG. 13 is a view illustrating change of the traveling direction of the robot cleaner direction in accordance with the embodiment such that a curved traveling region overlaps with a previously cleaned region.

The control unit 160, if the traveling direction of the robot cleaner 1 is changed through curved traveling, may set a curved traveling section to overlap with a previously cleaned region. With reference to FIG. 13, the control unit 160 may change the traveling direction of the robot cleaner 1 to cause a cleaning region of the robot cleaner 1 due to curved traveling to overlap with a region 500 which has been cleaned previously. Here, the overlap region is denoted by reference numeral 510.

The memory 170 stores the feature map generated by the feature map generation unit 130, the path map generated by the path map generation unit 150, and information regarding obstacles detected during traveling.

The cleaning unit 180 includes the main brush motor 33 and side brush motors 43 to draw in foreign substances, such as dust, from the floor of the cleaning area about which the robot cleaner 1 travels according to a drive command from the control unit 160 so as to perform cleaning.

Figure 14:
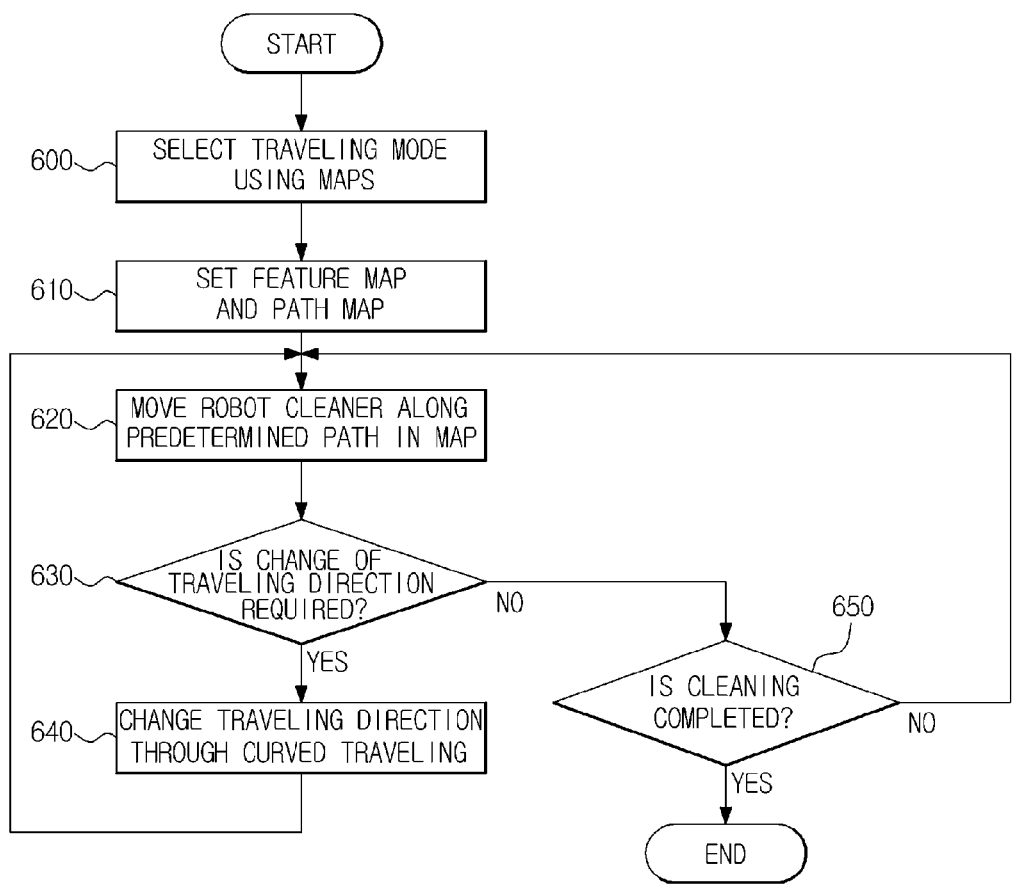
FIG. 14 is a flowchart illustrating a control method of the robot cleaner in accordance with the embodiment applied to a traveling mode requiring maps.

FIG. 14 is a flowchart illustrating a control method of the robot cleaner in accordance with the embodiment applied to a traveling mode requiring maps.

When a user selects a traveling mode that uses maps, the input unit 100 transmits information regarding the traveling mode that uses maps to the control unit 160. The traveling mode that uses maps may be a traveling mode using a feature map and a path map, or a traveling mode using only a path map (Operation 600).

The feature map generation unit 130 extracts a plurality of feature points from a ceiling image acquired by the photographing unit 110 and thus generates a feature map. The feature map includes feature points constantly measured from the surrounding environment. The path map generation unit 150 causes the robot cleaner 1 to move along walls, stores position data of the outermost portion of a cleaning territory, and generates a cleaning path map. In more detail, the path map generation unit 150 sets a territory about which cleaning will be performed based on position data acquired while traveling about the cleaning area, divides the territory about which cleaning will be performed into cleaning blocks having a regular size, predetermines a cleaning path to clean the cleaning blocks, and generates the cleaning path map (Operation 610).

The control unit 160 controls movement of the robot cleaner 1 along the predetermined cleaning path using the path map. If a change of the traveling direction of the robot cleaner 1 is required during movement of the robot cleaner 1 along the predetermined cleaning path, the control unit 160 causes the robot cleaner 1 to execute curved traveling to change the traveling direction of the robot cleaner 1. In the embodiment, the predetermined cleaning path includes a zigzag traveling path and, if a change of the traveling direction of the robot cleaner 1 is required during traveling of the robot cleaner 1 along the zigzag traveling path, curved traveling of the robot cleaner 1 is executed. Curved traveling is not accompanied by stopping during change of the traveling direction (Operations 620, 630, and 640).

The control unit 160 causes the robot cleaner 1 to execute cleaning while traveling along the predetermined path in the map, and finishes traveling of the robot cleaner 1 when the cleaning of the robot cleaner 1 has been completed (Operation 650).

Figure 15:
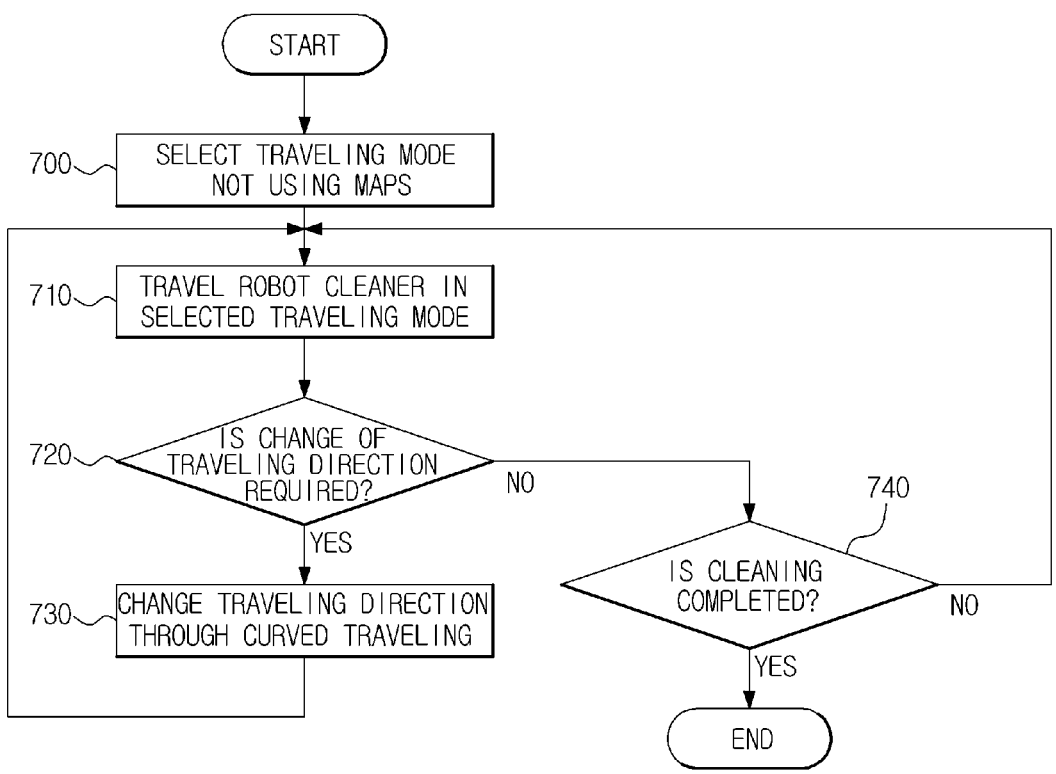
FIG. 15 is a flowchart illustrating a control method of the robot cleaner in accordance with the embodiment applied to a traveling mode not requiring maps.

FIG. 15 is a flowchart illustrating a control method of the robot cleaner in accordance with the embodiment applied to a traveling mode that does not require maps.

When a user selects a traveling mode that does not use maps, the input unit 100 transmits information regarding the traveling mode that does not use maps to the control unit 160. The traveling mode that does not use maps may be implemented in various patterns. For example, the traveling mode may be implemented in a random traveling pattern, a spiral traveling pattern, or a wall following traveling pattern (Operation 700).

The control unit 160 causes the robot cleaner 1 to travel in the traveling mode implemented by the random traveling pattern, etc., selected by the user (Operation 710).

If a change of the traveling direction is required while the robot cleaner 1 travels in the selected traveling mode, the control unit 160 causes the robot cleaner 1 to execute curved traveling to change the traveling direction of the robot cleaner 1, and finishes traveling of the robot cleaner 1 when the cleaning of the robot cleaner 1 has been completed (Operations 720, 730, and 740).

Further, a designer may set optimum control values of linear velocity (or moving velocity) and angular velocity (or rotating velocity) required to execute curved traveling of the robot cleaner 1 through experimentation.

Figure 16:
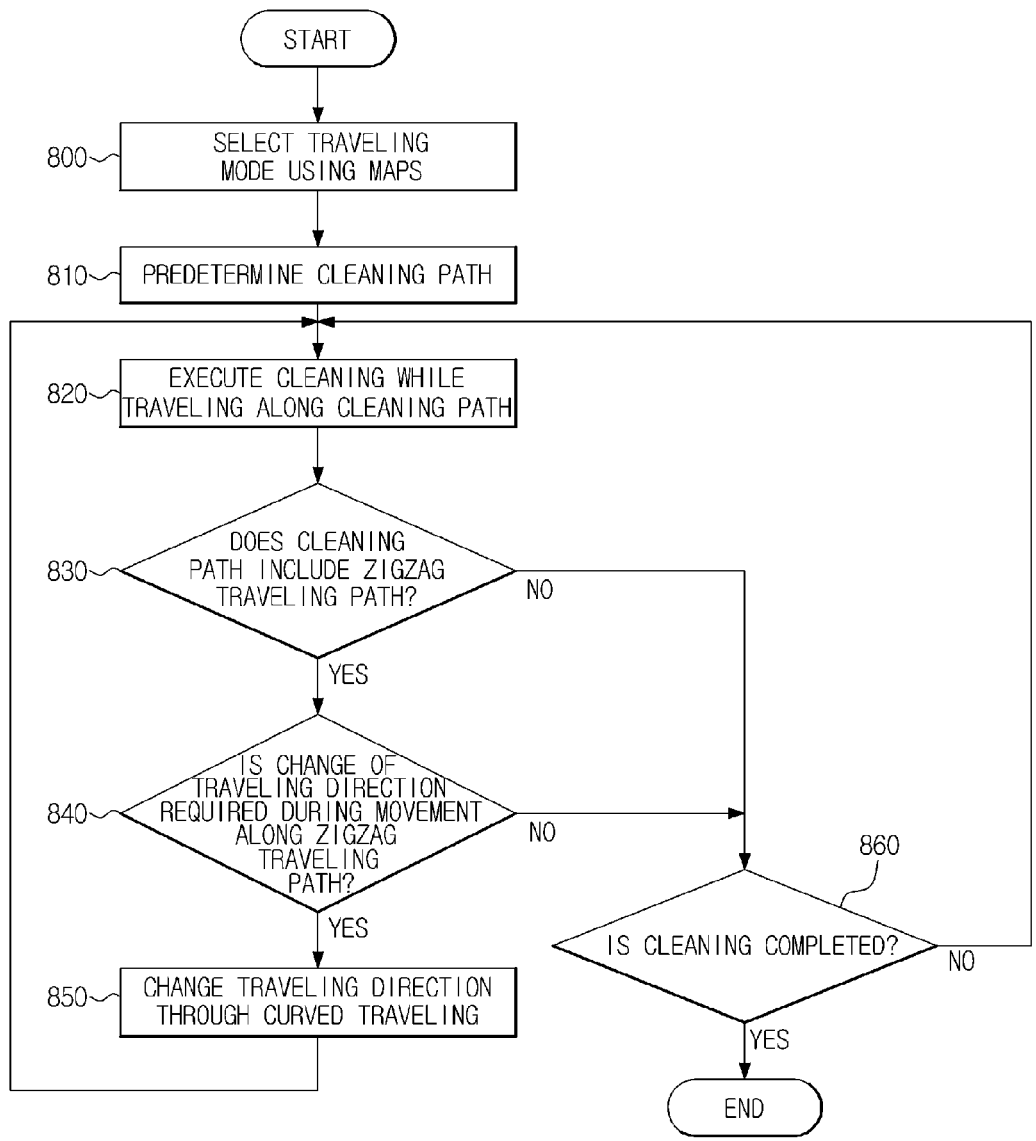
FIG. 16 is a flowchart illustrating a control method of the robot cleaner in accordance with the embodiment applied to a traveling mode employing a zigzag traveling path.

FIG. 16 is a flowchart illustrating a control method of the robot cleaner in accordance with the embodiment applied to a traveling mode employing a zigzag traveling path.

When a user selects a traveling mode that uses maps, the input unit 100 transmits information regarding the traveling mode that uses maps to the control unit 160 (Operation 800).

The path map generation unit 150 causes the robot cleaner 1 to move along walls, stores data of the outermost portion of a cleaning territory, and generates a cleaning path map. In more detail, the path map generation unit 150 sets a territory about which cleaning will be performed based on position data acquired while traveling about the cleaning area, divides the territory about which cleaning will be performed into cleaning blocks having a regular size, predetermines a cleaning path to clean the cleaning blocks, and generates the cleaning path map (Operation 810).

The control unit 160 controls traveling of the robot cleaner 1 along the cleaning path so as to execute cleaning. The control unit 160 judges whether or not the cleaning path includes a zigzag traveling path, and judges whether or not change of the traveling direction during traveling along the zigzag traveling path is required upon judging that the cleaning path includes the zigzag traveling path (Operations 820, 830, and 840).

The control unit 160 causes the robot cleaner 1 to execute curved traveling upon judging that change of the traveling direction during traveling along the zigzag traveling path is required, thus changing the traveling direction of the robot cleaner 1 (Operation 850).

The control unit 160 causes the robot cleaner 1 to execute cleaning while traveling along a predetermined path in the map, and finishes traveling of the robot cleaner 1 when the cleaning of the robot cleaner 1 has been completed (Operation 860).

As is apparent from the above description, a robot cleaner in accordance with one embodiment does not stop during a change of the traveling direction of the robot cleaner, thus decreasing the time required to clean an area.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a robot cleaner comprising:
    setting a territory about which cleaning will be performed based on position data acquired during traveling about a cleaning area;
    predetermining, by a processor, a cleaning path to clean the set territory; and
    increasing an angular velocity of the robot cleaner, and reducing a linear velocity of the robot cleaner to a predetermined linear velocity above zero, in order to change a traveling direction of the robot cleaner along the predetermined cleaning path.

2. The control method according to claim 1, further comprising:
    if an obstacle is sensed during the traveling about the cleaning area, allowing the robot cleaner to travel around the obstacle using a wall following method; and
    when the robot cleaner reaches a scheduled traveling line during traveling using the wall following method, allowing the robot cleaner to move along the traveling line.

3. The control method according to claim 1, further comprising:
    storing a cleaned region during the traveling about the cleaning area.

4. The control method according to claim 1, further comprising setting a clean path to clean the cleaning area, wherein the setting of the cleaning path to clean the cleaning area includes:
   storing data regarding an initial position where the traveling about the cleaning area begins and positions where the traveling direction of the robot cleaner is changed during the traveling about the cleaning area; and
   setting a cleaning path based on the initial position and the positions where the traveling direction of the robot cleaner is changed.

5. The control method according to claim 1, further comprising:
   dividing the cleaning area into cleaning blocks having a designated size.

6. The control method according to claim 5, wherein the cleaning blocks include information regarding a first indicator indicating presence of an obstacle, a second indicator indicating completion of cleaning of a block, and a third indicator indicating completion of cleaning of one line including a current block and the lower lines.

7. The control method according to claim 1, further comprising:
   extracting a plurality of feature points from surrounding environment around the cleaning area; and
   generating a feature map using the plurality of feature points.

8. The control method according to claim 1, further comprising:
   controlling the angular velocity of the robot cleaner, while constantly maintaining the reduced linear velocity at the predetermined linear velocity.

9. The control method according to claim 1, wherein the increasing the angular velocity of the robot cleaner, and reducing the linear velocity of the robot cleaner to a predetermined linear velocity above zero includes:
   controlling the angular velocity of the robot cleaner simultaneously with controlling the linear velocity of the robot cleaner during movement of the robot cleaner.

10. A robot cleaner comprising:
   drive wheels configured to move the robot cleaner;
   a brush configured to clean a cleaning area; and
   a controller configured to implement a method including:
      setting a territory about which cleaning will be performed based on position data acquired during traveling about the cleaning area;
      predetermining a cleaning path to clean the set territory; and
      increasing an angular velocity of the robot cleaner, and reducing a linear velocity of the robot cleaner to a predetermined linear velocity above zero, in order to change a traveling direction of the robot cleaner along the predetermined cleaning path.

11. The robot cleaner according to claim 10, further comprising an obstacle sensing unit including an ultrasonic sensor or an optical sensor to sense an obstacle located in the cleaning area.

12. The robot cleaner according to claim 11, wherein:
   if the obstacle sensing unit senses the obstacle during movement along the cleaning path, the obstacle sensing unit transmits information regarding sensing of the obstacle to the control unit; and
   if the control unit receives the information regarding sensing of the obstacle, the control unit allows the robot cleaner to travel around the obstacle using a wall following method and, when the robot cleaner reaches a scheduled traveling line during traveling using the wall following method, allows the robot cleaner to travel along the traveling line.

13. The robot cleaner according to claim 10, wherein the controller stores data regarding an initial position where traveling about the cleaning area is started and positions where the traveling direction of the robot cleaner is changed during traveling about the cleaning area, and sets a cleaning path based on the initial position and the positions where the traveling direction of the robot cleaner is changed.

14. The robot cleaner according to claim 10, wherein the controller extracts a plurality of feature points from surrounding environment around the cleaning area and to generate a feature map using the plurality of feature points.

15. The robot cleaner according to claim 10, further comprising a position measurement unit including at least one of an encoder connected to the drive wheels to sense rotating velocity of the robot cleaner, a gyro sensor to measure a direction angle of the robot cleaner using rotation inertia, and an acceleration sensor to measure acceleration of the robot cleaner.

16. The robot cleaner according to claim 10, further comprising a memory to store a cleaning path, information regarding the obstacle sensed during traveling along the cleaning path, and information regarding whether or not respective cleaning of cleaning blocks has been completed.

* * * * *